United States Patent [19]

Sugiyama et al.

[11] Patent Number: 6,166,125
[45] Date of Patent: Dec. 26, 2000

[54] GRADED-REFRACTIVE-INDEX OPTICAL PLASTIC MATERIAL AND METHOD FOR ITS PRODUCTION

[75] Inventors: Norihide Sugiyama; Hidenobu Murofushi; Takashi Okazoe; Masayuki Tamura; Shin Tatematsu; Jun Irisawa, all of Yokohama, Japan

[73] Assignee: Asahi Glass Company Ltd., Tokyo, Japan

[21] Appl. No.: 09/164,371

[22] Filed: Oct. 1, 1998

[30] Foreign Application Priority Data

Oct. 2, 1997 [JP] Japan ..................... 9-270122

[51] Int. Cl.$^7$ ...................... G02B 6/02
[52] U.S. Cl. ................ 524/462; 524/463; 385/143
[58] Field of Search ................... 524/462, 463

[56] References Cited

U.S. PATENT DOCUMENTS

| | | | |
|---|---|---|---|
| 3,665,067 | 5/1972 | Hopkin | 524/546 |
| 5,364,929 | 11/1994 | Dee | 524/462 |
| 5,690,878 | 11/1997 | Tuminello | 524/462 |
| 5,726,247 | 3/1998 | Michalczyk | 525/102 |
| 5,760,139 | 6/1998 | Koike et al. | |
| 5,783,636 | 7/1998 | Koike et al. | |

FOREIGN PATENT DOCUMENTS

| | | |
|---|---|---|
| 0 606 598 | 7/1994 | European Pat. Off. |
| 0 710 855 | 5/1996 | European Pat. Off. |
| 0 752 598 | 1/1997 | European Pat. Off. |

*Primary Examiner*—Paul R. Michl
*Attorney, Agent, or Firm*—Oblon, Spivak, McClelland, Maier & Neustadt, P.C.

[57] ABSTRACT

A graded-refractive-index optical plastic material comprising an amorphous fluorine-containing polymer (A) having substantially no C—H bond, and at least one fluorine-containing polycyclic compound (B) having a refractive index higher by at least 0.005 than the fluorine-containing polymer (A), wherein the fluorine-containing polycyclic compound (B) is distributed in the fluorine-containing polymer (A) with a concentration gradient such that the concentration decreases in a direction of from the center to the periphery, and the fluorine-containing polycyclic compound (B) is at least one fluorine-containing polycyclic compound selected from the group consisting of the following compounds (B1), (B2) and (B3):

(B1) a fluorine-containing non-condensed polycyclic compound having at least two fluorine-containing rings bonded by a bond containing at least one member selected from the group consisting of a triazine ring, an oxygen atom, a sulfur atom, a phosphorus atom and a metal atom, each of said fluorine-containing rings being a carbon ring or a heterocyclic ring and having a fluorine atom or a perfluoroalkyl group, said polycyclic compound having substantially no C—H bond;

(B2) a fluorine-containing non-condensed polycyclic compound having at least three fluorine-containing rings bonded directly or by a bond containing a carbon atom, each of said fluorine-containing rings being a carbon ring or a heterocyclic ring and having a fluorine atom or a perfluoroalkyl group, said polycyclic compound having substantially no C—H bond;

(B3) a fluorine-containing condensed polycyclic compound which is a condensed polycyclic compound composed of at least three carbon rings or heterocyclic rings, and which has substantially no C—H bond.

20 Claims, No Drawings

GRADED-REFRACTIVE-INDEX OPTICAL PLASTIC MATERIAL AND METHOD FOR ITS PRODUCTION

METHOD FOR ITS PRODUCTION

The present invention relates to a graded-refractive-index optical plastic material having high transparency and high thermal resistance simultaneously, which used to be difficult to attain with conventional optical plastics.

The optical plastic material of the present invention may be, per se, a light transmission medium such as an optical fiber, or a body material of a light transmission medium, such as a preform of an optical fiber.

A light transmission medium which is the optical plastic material of the present invention is free from light scattering and very transparent to light at wavelengths within a wide range from ultraviolet light to near infrared light, since it is made of an amorphous resin. Therefore, it is useful for optical systems for light source of various wavelengths. In particular, the optical plastic material of the present invention provides a light transmission medium with a small loss at a wavelength of 1,300 nm or 1,550 nm, at which a trunk vitreous silica fiber is used in the field of optical communication.

A light transmission medium which is the optical plastic material of the present invention has thermal resistance, chemical resistance, humidity resistance and nonflammability enough to withstand severe use conditions, for example, in an engine room of an automobile.

A light transmission medium which is the optical plastic material of the present invention is useful as various graded-refractive-index light transmission medium such as a graded-refractive-index optical fiber, a rod lens, an optical waveguide, an optical decoupler, a wavelength multiplexer, a wavelength demultiplexer, an optical attenuator, a light switch, an optical isolator, a light transmitting module, an light receiving module, a coupler, an optical deflector and an optical integrated circuit.

Here, "graded-refractive-index" means a region wherein the refractive index of a light transmission medium varies continuously in a specific direction. For example, a graded-refractive-index optical fiber shows a refractive index profile that the refractive index parabolically decreases from the center of the fiber along the radii.

In a case where the optical plastic material of the present invention is a body material of a light transmission medium, it is spun, for example, by hot drawing to prepare a light transmission medium such as a graded-refractive-index optical fiber.

Heretofore, as a resin for a graded-refractive-index plastic light transmission medium, an amorphous fluorine-containing polymer has been known which has a fluorine-containing alicyclic structure in its main chain (JP-A-8-5848). A graded-refractive-index plastic light transmitting medium obtainable by distributing in this resin a dispersion material which is dispersible in this resin and which has a refractive index different from this resin, is known to provide a light transmission medium with a low loss at a wavelength of 1,300 nm or 1,550 nm, which used to be hardly accomplished with a conventional light transmission medium such as a methyl methacrylate resin, a carbonate resin or a norbornene resin.

However, if a dispersion material differing in the refractive index, is distributed to form a refractive index gradation, there will be a problem such that the glass transition temperature Tg of the optical plastic decreases, and the thermal resistance decreases. Especially, in the case of an optical plastic material wherein a dispersion material having a not-so-high refractive index, such as an oligomer, i.e. a pentamer to an octamer, of chlorotrifluoroethylene (refractive index: 1.41), is dispersed, it is necessary to increase the content of the dispersion material in order to increase the numerical aperture NA ($NA=(n^2-m^2)^{1/2}$, where n is the maximum value of the refractive index in the graded-refractive-index optical plastic material, and m is the minimum value of the refractive index in the graded-refractive-index optical plastic material.

On the other hand, Tg of this oligomer is as low as about $-60°$ C., and it is a compound which is liquid at room temperature. Accordingly, if the content is increased in order to increase NA, Tg decreases. As a result, when the light transmission medium is exposed to a high temperature, the refractive index gradation tends to change, and the light transmission performance tends to change. Therefore, there is a problem that it is difficult to increase NA.

On the other hand, the dispersion material disclosed in JP-A-8-5848, such as dibromotetrafluorobenzene or chloroheptafluoronaphthalene, has a high refractive index, whereby the amount may be small in order to obtain an adequate numerical aperture NA. However, even with an optical plastic material having this dispersion material dispersed, Tg is low, and the thermal resistance is inadequate. Further, the solubility of such a dispersion material in the resin is not so high, whereby light scattering is likely to occur, thus leading to an increase of a light transmission loss.

It is an object of the present invention to solve the problems which conventional graded-refractive-index optical plastic materials had and to provide an optical plastic material having the thermal resistance improved and having a low light transmission loss.

The present inventors have conducted extensive studies, and as a result, they have considered it important that in order to obtain a fluorine-containing optical plastic material with a low scattering loss, having thermal resistance imparted, the dispersion material to form a refractive index gradation, is a compound having high Tg and a high refractive index, while securing the solubility, and have found that a certain specific fluorine-containing polycyclic compound is effective as such a compound.

Thus, the present invention provides a graded-refractive-index optical plastic material comprising an amorphous fluorine-containing polymer (A) having substantially no C—H bond, and at least one fluorine-containing polycyclic compound (B) having a refractive index higher by at least 0.005 than the fluorine-containing polymer (A), wherein the fluorine-containing polycyclic compound (B) is distributed in the fluorine-containing polymer (A) with a concentration gradient such that the concentration decreases in a direction of from the center to the periphery, and the fluorine-containing polycyclic compound (B) is at least one fluorine-containing polycyclic compound selected from the group consisting of the following compounds (B1), (B2) and (B3):

(B1) a fluorine-containing non-condensed polycyclic compound having at least two fluorine-containing rings bonded by a bond containing at least one member selected from the group consisting of a triazine ring, an oxygen atom, a sulfur atom, a phosphorus atom and a metal atom, each of said fluorine-containing rings being a carbon ring or a heterocyclic ring and having a fluorine atom or a perfluoroalkyl group, said polycyclic compound having substantially no C—H bond;

(B2) a fluorine-containing non-condensed polycyclic compound having at least three fluorine-containing rings bonded directly or by a bond containing a carbon atom, each of said fluorine-containing rings being a carbon ring or a heterocyclic ring and having a fluorine atom or a perfluoroalkyl group, said polycyclic compound having substantially no C—H bond;

(B3) a fluorine-containing condensed polycyclic compound which is a condensed polycyclic compound composed of at least three carbon rings or heterocyclic rings, and which has substantially no C—H bond.

Now, the present invention will be described in detail with reference to the preferred embodiments.

In the present invention, the fluorine-containing polycyclic compound (hereinafter referred to as the compound (B)) is a compound having substantially no C—H bond (i.e. no carbon-hydrogen bond) which otherwise causes absorption of near infrared light, and it is a compound having a refractive index higher by at least 0.005 than the amorphous fluorine-containing polymer (A) having substantially no C—H bond, as described hereinafter (hereinafter referred to as the polymer (A)).

The compound (B) is at least one fluorine-containing polycyclic compound selected from the group consisting of the above-mentioned compounds (B1), (B2) and (B3). The compound (B) may be one member selected from the above group, or may be a combination of at least two members selected from the same group.

The compound (B) is preferably a perfluoro compound having a structure wherein all hydrogen atoms in the compound are substituted by fluorine atoms or perfluoroalkyl groups. Unless the purpose of the present invention is not impaired, part of fluorine atoms in this perfluoro compound may be substituted by one or two chlorine or bromine atoms. The number average molecular weight of the compound (B) is preferably from $3 \times 10^2$ to $2 \times 10^3$, more preferably from $3 \times 10^2$ to $1 \times 10^3$.

With a view to increasing solubility in the polymer (A), the compound (B) preferably contains a perfluoroalkyl group. With a view to increasing the difference in refractive index from the polymer (A), the compound (B) preferably contains no perfluoroalkyl group.

In the present invention, the fluorine-containing ring is a carbon ring or a heterocyclic ring, having a fluorine atom or a perfluoroalkyl group. The carbon ring and the heterocyclic ring are preferably selected from at least 4-membered rings, and they are more preferably 4- to 6-membered rings. The atoms constituting the heterocyclic ring are preferably selected from a carbon atom, a nitrogen atom, an oxygen atom, a sulfur atom and a phosphorus atom. The perfluoroalkyl group is preferably a $C_{1-20}$ perfluoroalkyl group.

The carbon ring may, for example, be a cyclic saturated hydrocarbon ring such as a cyclopentane ring or a cyclohexane ring; an aromatic hydrocarbon ring such as a benzene ring or a ring having one or two hydrogen atoms in a benzene ring substituted by a methyl group; or a cyclic unsaturated hydrocarbon ring other than an aromatic hydrocarbon ring, such as a cyclopentene ring or a cyclohexene ring.

The heterocyclic ring may, for example, be a heterocyclic ring containing one type of a hetero atom, such as a thiophene ring, a furan ring, a pyridine ring, a triazine ring or a triazole ring, or a heterocyclic ring containing two types of hetero atoms such as an isothiazole ring.

A preferred fluorine-containing ring is a fluorine-containing aromatic hydrocarbon ring, and a more preferred fluorine-containing ring is a perfluoroaromatic hydrocarbon ring. As the aromatic hydrocarbon ring, a benzene ring is preferred.

In the present invention, the fluorine-containing non-condensed polycyclic compound is a compound wherein two or more fluorine-containing rings are bonded without co-owning two or more atoms. Here, the term "bonded without co-owning two or more atoms" means that the fluorine-containing rings are bonded with one atom co-owned by them, or the fluorine-containing rings are directly bonded or indirectly bonded. Here, the term "the fluorine-containing rings are indirectly bonded" means that the fluorine-containing rings are bonded via at least one atom.

In a case where two fluorine-containing rings are bonded, such a bond is a bond containing at least one member selected from the group consisting of a triazine ring, oxygen, sulfur, phosphorus and metal. In a case where three or more fluorine-containing rings are bonded, such a bond is a bond containing at least one member selected from the group consisting of a triazine ring, oxygen, sulfur, phosphorus and metal, direct bonding of three or more fluorine-containing rings, or a bond containing carbon.

The metal atom is preferably a bivalent to tetravalent metal atom selected from the group consisting of Zn, Sn, Pb, Ge, Si, Ti, Hg, Tl, As, Se, Te and Cd. A more preferred metal is Sn, since it presents a fluorine-containing non-condensed polycyclic compound having good thermal stability and chemical stability.

As a fluorine-containing non-condensed polycyclic compound having at least two fluorine-containing rings bonded by a bond containing a triazine ring, a fluorine-containing aromatic triazine compound of the following formula 1, 2 or 3, is preferred. In this specification, $\Phi^g$ (wherein g is an integer of from 1 to 6) represents a residue having g fluorine atoms removed from perfluorobenzene. In a case where fluorine atoms still remain after removing g fluorine atoms, it may have a structure having some or all of such fluorine atoms substituted by a perfluoroalkyl group.

As a fluorine-containing non-condensed polycyclic compound having at least two fluorine-containing rings bonded by a bond containing a sulfur atom, a fluorine-containing aromatic sulfur-containing compound of the following formula 4 or 5 is preferred.

As a fluorine-containing non-condensed polycyclic compound having at least two fluorine-containing rings bonded by a bond containing a phosphorus atom, a compound represented by $(\Phi^1)_3$-P or a compound having rings bonded by a bond containing a phosphazatriene ring, represented by the following formula 6, is preferred.

As a fluorine-containing non-condensed polycyclic compound having at least two fluorine-containing rings bonded by a bond containing a metal atom, a fluorine-containing aromatic metal-containing compound of the following formula 7 or 8, is preferred.

As a fluorine-containing non-condensed polycyclic compound having at least three fluorine-containing rings bonded directly or by a bond containing carbon, a fluorine-containing aromatic compound of the following formula 9, 10, 11 or 12 is preferred. With a view to not impairing the transparency of the graded-refractive-index optical plastic material, the total number of $\Phi^1$ to $\Phi^4$ in the fluorine-containing aromatic compound is preferably from 3 to 5.

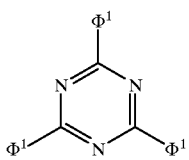
1

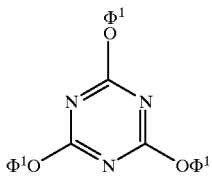
2

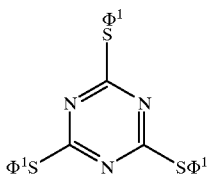
3

F-(-Φ²-S-)$_h$-Φ¹ (wherein h is an integer of 4 from 1 to 4.)  4

Φ$^k$(-S-Φ¹)$_k$ (wherein k is an integer of from 1 to 6.)  5

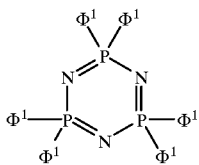
6

(Φ¹)$_p$-M  7

(Φ¹-S-)$_q$-M  8

(wherein M is a metal atom selected from the group consisting of Zn, Sn, Pb, Ge, Si, Tl, Hg, Ti, As, Se, Te and Cd, and each of p and q is a valency of metal M and an integer of from 2 to 4.)

F-(Φ²)$_r$-F (wherein r is an integer of from 3 to 7.)  9

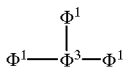
10

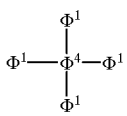
11

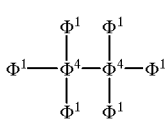
12

In a fluorine-containing condensed polycyclic compound which is a condensed polycyclic compound composed of at least three carbon rings or heterocyclic rings, wherein some or all of hydrogen atoms are substituted by a fluorine atom or a fluorine-containing group, the carbon rings and the heterocyclic rings are preferably at least 4-membered rings, more preferably from 4- to 6-membered rings. Preferred atoms constituting such heterocyclic rings are selected from a carbon atom, a nitrogen atom, an oxygen atom, a sulfur atom and a phosphorus atom.

The fluorine-containing condensed polycyclic compound is preferably a fluorine-containing condensed polycyclic hydrocarbon composed of three or four carbon rings, such as perfluorofluorene, perfluorophenalene, perfluorophenanthrene, perfluoroanthracene, perfluorotriphenylene, perfluoropyrene, perfluorochrysene or perfluoronaphthacene, or a fluorine-containing condensed polycyclic compound of the following formula 13 or 14.

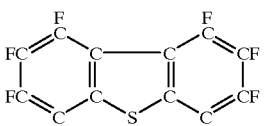
13

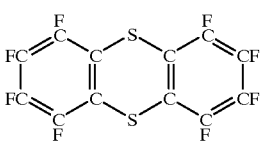
14

With a view to not impairing the transparency of the graded-refractive-index optical plastic material, a fluorine-containing condensed polycyclic hydrocarbon composed of three carbon rings, such as perfluorofluorene, perfluorophenalene, perfluorophenanthrene or prefluoroanthracene, is more preferred.

The compound (B) is preferably selected from those having thermal stability and high solubility in the polymer (A) and those which do not impair the transparency of the graded-refractive-index optical plastic material.

As such a compound (B), particularly preferred is a fluorine-containing non-condensed polycyclic compound having at least two fluorine-containing rings bonded by a bond containing at least a triazine ring. The triazine ring may be a 1,2,3-triazine ring, a 1,2,4-triazine ring or a 1,3,5-triazine ring and is preferably a 1,3,5-triazine ring.

The polymer (A) in the present invention is amorphous and is a polymer which does not substantially have a C—H bond causing absorption of near infrared light. The polymer (A) is not particularly limited so long as it is an amorphous fluorine-containing polymer having substantially no C—H bond. However, it is preferably a fluorine-containing polymer having a fluorine-containing alicyclic structure in its main chain.

Here, the term "having a fluorine-containing alicyclic structure in its main chain" means that the polymer has a structure in which at least one of carbon atoms constituting the alicyclic group is the carbon atom in the carbon chain constituting the main chain, and a fluorine atom or a fluorine-containing group is bonded at least to some of the carbon atoms constituting the alicyclic ring. The fluorine-containing alicyclic structure is preferably a fluorine-containing aliphatic ether ring structure.

The viscosity of the polymer (A) in a molten state, is preferably from $10^3$ to $10^5$ poise at a melting temperature of from 200 to 300° C. If the melt viscosity is too high, melt spinning tends to be difficult, and further, diffusion of the compound (B) which is required for the formation of the refractive index gradation, tends to hardly take place, whereby formation of the refractive index gradation tends to be difficult. On the other hand, if the melt viscosity is too low, there will be a practical problem. Namely, in a case where it is used as a light transmission medium in an electronic equipment or in an automobile, if it is exposed to a high temperature, it tends to soften, whereby the light transmitting performance tends to deteriorate.

The number average molecular weight of the polymer (A) is preferably from $1 \times 10^4$ to $5 \times 10^6$, more preferably from $5 \times 10^4$ to $1 \times 10^6$. If the molecular weight is too small, the thermal resistance is likely to be impaired, and if it is too large, formation of a light transmission medium having a refractive index gradation tends to be difficult.

The polymer having a fluorine-containing alicyclic structure is preferably one obtained by polymerizing a monomer having a fluorine-containing alicyclic structure, or a polymer having a fluorine-containing alicyclic structure in its main chain, which is obtainable by cyclic polymerization of a fluorine-containing monomer having at least two polymerizable double bonds.

The polymer having a fluorine-containing alicyclic structure in its main chain, which is obtainable by polymerizing a monomer having a fluorine-containing alicyclic structure, is known, for example, from JP-B-63-18964. Namely, a polymer having a fluorine-containing alicyclic structure in its main chain, can be obtained by homopolymerization of a monomer having a fluorine-containing alicyclic structure such as perfluoro(2,2-dimethyl-1,3-dioxole), or copolymerizing such a monomer with a radical-polymerizable monomer such as tetrafluoroethylene, trichlorofluoroethylene or perfluoro(methyl vinyl ether).

Further, a polymer having a fluorine-containing alicyclic structure in its main chain, which is obtainable by cyclic polymerization of a fluorine-containing monomer having at least two polymerizable double bonds, is known, for example, from JP-A-63-238111 or JP-A-63-238115. Namely, a polymer having a fluorine-containing alicyclic structure in its main chain, can be obtained by cyclic polymerization of a monomer such as perfluoro(allyl vinyl ether) or perfluoro(butenyl vinyl ether) or by copolymerizing such a monomer with a radical polymerizable monomer such as tetrafluoroethylene, chlorotrifluoroethylene or perfluoro(methyl vinyl ether).

Further, the polymer having a fluorine-containing alicyclic structure in its main chain, may also be obtained by copolymerizing a monomer having a fluorine-containing alicyclic structure such as perfluoro(2,2-dimethyl-1,3-dioxole) with a fluorine-containing monomer having at least two polymerizable double bonds, such as perfluoro(allyl vinyl ether) or perfluoro(butenyl vinyl ether).

The polymer having a fluorine-containing alicyclic structure is preferably one containing at least 20 mol %, particularly preferably at least 40 mol %, of polymer units having a fluorine-containing alicyclic structure, based on the total polymer units in the polymer having a fluorine-containing alicyclic structure, from the viewpoint of the transparency, mechanical properties, etc.

The polymer having a fluorine-containing alicyclic structure may be those having repeating units represented by any one of the following formulae 15 to 18 as specific examples. Further, some of fluorine atoms in such a polymer having a fluorine-containing alicyclic structure may be substituted by chlorine atoms in order to increase the refractive index.

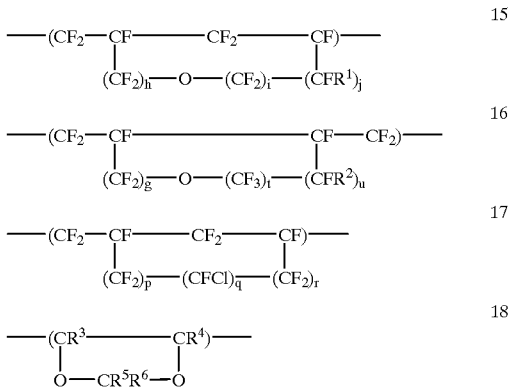

In the formulae 15 to 18, h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r which are independent of one another, is an integer of from 0 to 5, p+q+r is from 1 to 6, each of $R^1$ to $R^6$ which are independent of one another, is a fluorine atom, a chlorine atom, a deuterium atom (D) or a trifluoromethyl group.

The monomer having a fluorine-containing alicyclic structure is preferably a monomer selected from the compounds of the following formulae 19 to 21.

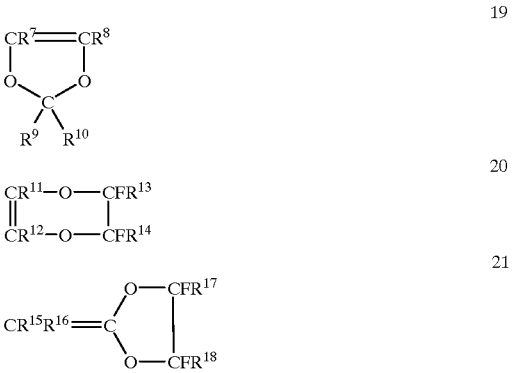

In the formulae 19 to 21, each of $R^7$ to $R^{18}$ which are independent of one another, is a fluorine atom, a chlorine atom or a trifluoromethyl group, or each pair of $R^9$ and $R^{10}$, $R^{13}$ and $R^{14}$, and $R^{17}$ and $R^{18}$, may together form a bivalent group selected from the group consisting of $-(CF_2)_4-$, $-(CF_2)_3-$, $-(CF_2)_2-$, $-CF_2-O-CF_2-$, $-(CF_2)_2-O-CF_2-$, $-O-(CF_2)_2-$ and $-O-(CF_2)_3-$.

Specific examples of the compounds of the formulae 19 to 21 include compounds of the following formulae 22 to 29:

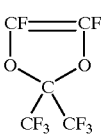

-continued

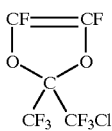

23

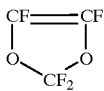

24

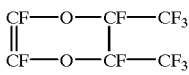

25

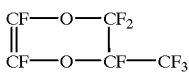

26

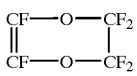

27

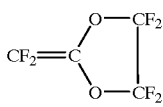

28

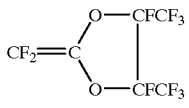

29

As the fluorine-containing monomer having at least two polymerizable double bonds, compounds of the following formulae 30 to 32, are preferred.

$$CY^1Y^2=CY^3OCY^4Y^6CY^6Y^7CY^8=CY^9Y^{10} \quad (30)$$

$$CZ^1Z^2=CZ^3OCZ^4Z^5CZ^6=CZ^7Z^8 \quad (31)$$

$$CW^1W^2=CW^3OCW^4W^6OCW^6=CW^7W^8 \quad (32)$$

In the formulae 30 to 32, each of $Y^1$ to $Y^{10}$, $Z^1$ to $Z^8$ and $W^1$ to $W^8$, which are independent of one another, is a fluorine atom, a chlorine atom, a deuterium atom or a trifluoromethyl group.

Specific examples of the compounds of the formulae 30 to 32, include the following compounds:
$CF_2=CFOCF_2CF_2CF=CF_2$
$CF_2=CFOCCl_2CF_2CF=CF_2$
$CF_2CFOCF_2CF_2CCl=CF_2$
$CF_2=CFOCF_2CFClCF=CF_2$
$CF_2=CFOCF_2CF_2CF=CFCl$
$CF_2=CFOCF_2CF(CF_3)CF=CF_2$
$CF_2=CFOCF_2CF(CF_3)CCl=CF_2$
$CF_2=CFOCF_2CF=CF_2$
$CF_2=CFOCF(CF_3)CF=CF_2$
$CF_2=CFOC(CF_3)_2CF=CF_2$
$CF_2=CFOCF_2OCF=CF_2$
$CF_2=CClOCF_2OCCl=CF_2$
$CF_2=CFOCCl_2OCF=CF_2$
$CF_2=CFOC(CF_3)_2OCF=CF_2$ In production of the optical plastic material of the present invention, the molding of the resins and the formation of the graded-refractive-index may be carried out simultaneously or separately. For example, the optical plastic material of the present invention may be so produced by spinning or extrusion molding that a graded-refractive-index is formed at the same time as molding the resins. It is also possible to form a graded-refractive-index after molding the resins by spinning or extrusion molding. Further, it is possible to produce a preform (body material) having a graded-refractive-index and then form (for example spin) the preform into an optical plastic material such as an optical fiber. As described above, the optical plastic material of the present invention also means such a preform having a graded-refractive-index.

The optical plastic material of the present invention is most preferably a graded-refractive-index optical fiber. In this optical fiber, the compound (B) is a material having a refractive index higher than the polymer (A), and the compound (B) is distributed with a concentration gradient such that the concentration decreases in a direction of from the center of the optical fiber to the periphery. Accordingly, the optical fiber will have a refractive index gradient such that the refractive index decreases in a direction of from the center of the optical fiber to the periphery. The concentration gradient of the compound (B) can be formed usually by disposing the compound (B) at the center of the polymer (A)) in a molten state and permitting the compound (B) to diffuse in a direction towards the periphery.

The compound (B) has a refractive index higher by at least 0.005 than the polymer (A), whereby it is possible to make the difference in refractive index as between the maximum value n and the minimum value m of the refractive index in the optical plastic material large. Namely, it is possible to bring the numerical aperture NA represented by $(n^2-m^2)^{1/2}$ to a level of at least 0.20. The compound (B) preferably has a refractive index which is higher by at least 0.01 than the polymer (A). The refractive index of the compound (B) is preferably at least 1.45, more preferably at least 1.47.

In general, Tg of a polymer decreases when a low molecular weight compound is added to the polymer. In a case where a compound having a refractive index which is not so large, is used as a material for forming the refractive index difference, the content in the polymer is obliged to be large, whereby Tg tends to decrease, and the thermal resistance tends to be low.

Whereas, the compound (B) in the present invention has a high refractive index, and the desired refractive index difference can be formed even by an addition of a small amount, for example, in an amount such that the concentration of the compound (B) at the center of the optical plastic material will be at most 15 wt %, whereby there is a merit such that the decrease in Tg is little.

Further, Tg of the compound (B) is high, whereby Tg at the center of the optical plastic material can be made at least 70° C. Depending upon the type of the compound (B), Tg at the center of the optical plastic material can be made to be at least 90° C. The thermal resistance of the optical plastic material of the present invention can thereby be remarkably improved.

Further, the compound (B) has good solubility in the polymer (A), and its saturated solubility is from 5 to 20 wt %. With respect to the solubility parameter (SP value) as an index for the solubility, the compound (B) has a solubility parameter of from 8 to 10 $(cal/cm^3)^{1/2}$ which is close to the solubility parameter of from 6 to 7 $(cal/cm^3)^{1/2}$ of the polymer (A). This is believed to be attributable to the excellent solubility.

In a case where the content of the compound (B) in the polymer (A) is lower than the above saturated solubility, the transparency of the optical plastic material of the present invention is good, and there will be little light scattering caused by microscopic phase separation or by crystallites of the compound (B).

A light transmission medium which is the optical plastic material of the present invention can be made to have a transmission loss per 100 m of at most 15 dB at wavelengths of from 700 to 1,600 nm. It is quite advantageous that the transmission loss is at such a low level at relatively long wavelengths of from 700 to 1,600 nm.

Namely, it has advantages that since it is available to the same wavelength as vitreous silica optical fiber, it can be connected to a vitreous silica optical fiber without any difficulties, and that an inexpensive light source can be used as compared with the case of conventional plastic optical fibers which are available only to light at wavelengths shorter than from 700 to 1,600 nm.

Among the transmission characteristics of a light transmission medium, a transmission bandwidth is regarded as an important characteristic like the above transmission loss. The transmission bandwidth is desired to be broad in order to transmit a large quantity of information at a high speed. A vitreous silica single mode fiber which is presently used for long distance communication has a transmission bandwidth as broad as a few 10 GHz.km.

On the other hand, a plastic optical fiber has a large fiber diameter and can easily be connected to a light source or light receiving element, or to another fiber, whereby establishment of an inexpensive short distance communication system is highly expected.

A usual plastic optical fiber is a step index type, whereby the transmission bandwidth is as narrow as a few MHz.km. To overcome such a drawback, a graded-refractive-index plastic optical fiber having a broad transmission bandwidth like the present invention, has been proposed. With such a graded-refractive-index plastic optical fiber, if the refractive index gradation is not thermally stable, the transmission bandwidth tends to consequently decrease.

The optical plastic material of the present invention has thermal resistance which has been remarkably improved, whereby the thermal stability of the refractive index gradation is high, and decrease in the transmission bandwidth can be prevented even when it is exposed to a high temperature of at least room temperature, for a long period of time.

Now, the present invention will be described in further detail with reference to Examples. However, it should be understood that the present invention is by no means restricted to such specific Examples. In the following Examples, Examples 1 to 3 represent Preparation Examples of the polymer (A), Examples 4 to 10, 16 and 17 represent Working Examples, and Examples 11 to 15 represent Comparative Examples.

EXAMPLE 1

750 g of perfluoro(butenyl vinyl ether) (PBVE), 4 kg of deionized water, 260 g of methanol and 3.7 g of ((CH$_3$)$_2$CHOCOO)$_2$ were put into a flask having an internal capacity of 5 lit. After substituting the interior of the system by nitrogen, suspension polymerization was carried out at 40° C. for 22 hours, to obtain 690 g of a polymer having a number average molecular weight of about 5×10$^4$. This polymer was treated at 250° C. for 5 hours in an atmosphere of fluorine/nitrogen mixed gas (fluorine gas concentration: 20 vol %), to obtain a polymer having good light transmittance and thermal stability (hereinafter referred to as polymer Al).

The intrinsic viscosity [η] of polymer Al was 0.3 at 30° C. in perfluoro(2-butyltetrahydrofuran) (PBTHF). Tg of polymer Al was 108° C., and it was a transparent glass-like polymer which was tough at room temperature. Further, it had a refractive index of 1.342 and a SP value of 6.6 (cal/cm$^3$)$^{1/2}$.

EXAMPLE 2

173 g of PBVE, 27 g of perfluoro(2,2-dimethyl-1,3-dioxole) (PDD), 200 g of PBTHF and 2 g of ((CH$_3$)$_2$CHOCOO)$_2$ as a polymerization initiator, were put into a stainless steel autoclave having an internal capacity of 1 lit. After substituting the interior of the system by nitrogen, polymerization was carried out at 40° C. for 20 hours to obtain 20 g of a transparent polymer having a number average molecular weight of about 1.5×10$^5$. This polymer was treated at 250° C. for 5 hours in an atmosphere of fluorine/nitrogen mixed gas (fluorine gas concentration: 20 vol %) to obtain a polymer having good light transmittance and thermal stability (hereinafter referred to as polymer A2). Polymer A2 had a Tg of 150° C., a refractive index of 1.325 and a SP value of 6.5 (cal/cm$^3$)$^{1/2}$.

EXAMPLE 3

PDD and tetrafluoroethylene were subjected to radical polymerization in a weight ratio of 80:20 using PBTHF as a solvent, to obtain a polymer having a Tg of 160° C. and a number average molecular weight of about 1.7×10$^5$. This polymer was treated at 250° C. for 5 hours in an atmosphere of fluorine/nitrogen mixed gas (fluorine gas concentration: 20 vol %) to obtain a polymer having good light transmittance and thermal stability (hereinafter referred to as polymer A3). Polymer A3 was colorless transparent and had a refractive index of 1.305 and a SP value of 6.3 (cal/cm$^3$)$^{1/2}$.

EXAMPLE 4

A mixture comprising polymer Al and perfluoro (tetraphenyltin) (the latter being 7 wt % in the mixture), was charged into a sealed glass tube and melt-molded at 250° C. to obtain a cylindrical molded product (hereinafter referred to as molded product a). Molded product a had a refractive index of 1.357 and a Tg of 91° C.

Then, a cylindrical tube made solely of polymer Al was prepared by melt molding, and molded product a was inserted into this cylindrical tube and heated to 200° C. for integration to obtain a preform. This preform was melt-spun at 230° C. to obtain a optical fiber wherein the refractive index gradually decreased from the center towards the periphery. The light transmission property of the optical fiber thus obtained was 200 dB/km at 780 nm, 150 dB/km at 850 nm and 120 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradation was measured by an Interphako interference microscope and compared with the refractive index gradient before the storage, whereby no change was observed. Further, the transmission property was evaluated by measuring the transmission bandwidth by the following pulse method.

Namely, using a pulse generator, a pulse laser beam was generated and introduced into the optical fiber, whereupon the outgoing beam was detected by a sampling oscilloscope. This detected signal was subjected to Fourier transformation to analyze the frequency characteristic, whereby the transmission bandwidth was measured. The transmission bandwidth was measured after storing the optical fiber at 70° C. for 1,000 hours, whereby it was 260 MHz.km before or after the storage. Thus, no decrease of the transmission bandwidth was observed, whereby the thermal resistance was confirmed to be good.

EXAMPLE 5

A mixture comprising polymer Al and perfluoro (triphenylphosphine) (the latter being 7 wt % in the mixture), was charged into a sealed glass tube and melt-molded at 250° C. to obtain a cylindrical molded product (hereinafter referred to as molded product b). Molded product b had a refractive index of 1.357 and a Tg of 88° C.

Then, a cylindrical tube made solely of polymer Al was prepared by melt molding, and molded product b was inserted into this cylindrical tube and heated at 200° C. for integration to obtain a preform. This preform was melt-spun at 230° C. to obtain an optical fiber in which the refractive index gradually decreased from the center towards the periphery. The light transmission property of the obtained optical fiber was 200 dB/km at 780 nm, 150 dB/km at 850 nm and 120 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as in Example 4 and the property was compared before and after the storage, whereby no decrease of the zone was observed at level of 240 dB.km, whereby the thermal resistance was confirmed to be good.

EXAMPLE 6

A mixture comprising polymer Al and 1,4-bis (perfluorophenylthio)tetrafluorobenzene (the latter being 5 wt % in the mixture), was charged into a sealed glass tube and melt-molded at 250° C. to obtain a cylindrical molded product (hereinafter referred to as molded product c). Molded product c had a refractive index of 1.357 and a Tg of 85° C.

Then, a cylindrical tube made solely of polymer Al was prepared by melt molding, and molded product c was inserted into this cylindrical tube and heated to 200° C. for integration, to obtain a preform. This preform was melt-spun at 230° C. to obtain an optical fiber wherein the refractive index gradually decreased from the center towards the periphery. The light transmission property of the obtained optical fiber was 200 dB/km at 780 nm, 150 dB/km at 850 nm and 120 dB/km at 1,300 nm. Thus, the optical fiber was found to be capable of transmitting light ranging from visible light to near infrared light satisfactorily.

This optical fiber was stored in an oven of 70° C. for 1,000 hours and then taken out, whereupon the refractive gradient was measured by an Interphako interference microscope and compared with the refractive index gradient before the storage, whereby no particular change was observed. Further, the transmission bandwidth as measured by the same pulse method as used in Example 4, and the property was compared before and after the storage, whereby the thermal resistance was confirmed to be good as no decrease in the transmission bandwidth took place, at a level of 250 dB.km.

EXAMPLE 7

A mixture comprising polymer Al and 2,4,6-tris (perfluorophenyl)-1,3,5-triazine (the latter being 5 wt % in the mixture), was charged into a sealed glass tube and melt-molded at 250° C. to obtain a cylindrical molded product (hereinafter referred to as molded product d). Molded product d had a refractive index of 1.357 and a Tg of 95° C.

Then, a cylindrical tube made solely of polymer Al was prepared by melt molding, molded product d was inserted into this cylindrical tube and heated to 200° C. for integration to obtain a preform. This preform was melt-spun at 240° C. to obtain an optical fiber wherein the refractive index gradually decreased from the center towards the periphery. The light transmission property of the obtained optical fiber was 120 dB/km at 780 nm, 100 dB/km at 850 nm and 80 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index degradation was measured by an Interphako interference microscope and compared with the refractive index gradient before the storage, whereby no particular change was observed. Further, the transmission bandwidth was measured by the same pulse method as in Example 4, and the property was compared before and after the storage, whereby no decrease of the zone was observed, at a level of 300 dB.km, whereby the thermal resistance was confirmed to be good.

EXAMPLE 8

A mixture comprising polymer Al and perfluoroterphenyl (the latter being 5 wt % in the mixture), was charged into a glass tube and melt-molded at 250° C. to obtain a cylindrical molded product (hereinafter referred to as molded product e). Molded product e had a refractive index of 1.357 and a Tg of 95° C.

Then, a cylindrical tube made solely of polymer Al was prepared by melt molding, and molded product e was inserted into this cylindrical tube and heated to 200° C. for integration to obtain a preform. This preform was melt-spun at 230° C. to obtain an optical fiber wherein the refractive index gradually decreased from the center towards the periphery. The light transmission property of the obtained optical fiber was 170 dB/km at 780 nm, 140 dB/km at 850 nm and 110 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as used in Example 4, and the property was compared as between before and after the storage, whereby no decrease in the transmission bandwidth was observed at 260 dB.km, whereby the thermal resistance was confirmed to be good.

EXAMPLE 9

A mixture comprising polymer Al and perfluoroquaterphenyl (the latter being 5 wt % in the mixture), was charged into a sealed glass tube and melt-molded at 250° C. to obtain a cylindrical molded product (hereinafter referred to as molded product f). Molded product f had a refractive index of 1.357 and a Tg of 93° C.

Then, a cylindrical tube made solely of polymer Al was prepared by melt molding, and molded product f was inserted into this cylindrical tube and heated to 200° C. for integration to obtain a preform. This preform was melt-spun at 240° C. to obtain an optical fiber wherein the refractive index gradually decreased from the center towards the periphery. The light transmission property of the obtained optical fiber was 190 dB/km at 780 nm, 150 dB/km at 850 nm and 120 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as in Example 4, and the property was compared as between before and after the storage, whereby no decrease in the transmission bandwidth was observed at a level of 280 dB.km, whereby the thermal resistance was confirmed to be good.

EXAMPLE 10

A mixture comprising polymer Al and perfluoroanthracene (the latter being 5 wt % in the mixture), was charged into a sealed glass tube and melt-molded at 250° C. to obtain a cylindrical molded product (hereinafter referred to as molded product g). Molded product g had a refractive index of 1.357 and a Tg of 95° C.

Then, a cylindrical tube made solely of polymer Al was prepared by melt molding, and molded product g was inserted into this cylindrical tube and heated to 200° C. for integration to obtain a preform. This preform was melt-spun at 240° C. to obtain an optical fiber wherein the refractive index gradually decreased from the center towards the periphery. The light transmission property of the obtained optical fiber was 190 dB/km at 780 nm, 150 dB/km at 850 nm and 120 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as in Example 4, and the property was compared as between before and after the storage, whereby no decrease in the transmission bandwidth was observed at a level of 310 dB.km, whereby the thermal resistance was confirmed to be good.

EXAMPLE 11

A mixture comprising polymer Al and an oligomer of trichlorofluoroethylene (average molecular weight: 850, refractive index: 1.41) (the latter being 15 wt % in the mixture), was charged into a sealed glass tube and melt-molded at 250° C. to obtain a cylindrical molded product (hereinafter referred to as molded product h). Molded product h had a refractive index of 1.357 and a Tg of 75° C.

Then, a cylindrical tube made solely of polymer Al was prepared by melt molding, and molded product h was introduced in this cylindrical tube and heated to 200° C. for integration to obtain a preform. This preform was melt-spun at 230° C. to obtain a graded-refractive-index optical fiber wherein the refractive index gradually decreased from the center towards the periphery. The light transmission property of the obtained optical fiber was 110 dB/km at 780 nm, 100 dB/km at 850 nm and 80 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an interference microscope and compared with the refractive index gradient before the storage, whereby a decrease of the refractive index was observed in the vicinity of the center of the core. Accordingly, a decrease in the transmission bandwidth was observed. Namely, 260 MHz.km before the storage decreased to 160 MHz.km after the storage.

EXAMPLE 12

A mixture comprising polymer Al and perfluorobiphenyl (refractive index: 1.45) manufactured by Aldrich Co. (the latter being 7 wt % in the mixture), was charged into a sealed glass tube and melt-molded at 250° C. to obtain a cylindrical molded product (hereinafter referred to as molded product i). Molded product i had a refractive index of 1.357 and a Tg of 73° C.

Then, a cylindrical tube made solely of polymer Al was prepared by melt molding, and molded product i was inserted into this cylindrical tube and heated to 200° C. for integration to obtain a preform. This preform was melt-spun at 230° C. to obtain a graded-refractive-index optical fiber wherein the refractive index gradually decreased from the center towards the periphery. The light transmission property of the obtained optical fiber was 150 dB/km at 780 nm, 120 dB/km at 850 nm and 100 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an interference microscope and compared with the refractive index gradient before the storage, whereby a decrease in the refractive index was observed in the vicinity of the center of the core. Accordingly, a decrease in the transmission bandwidth was observed. Namely, transmission bandwidth of 200 MHz.km before the storage was found to have decreased to 110 MHz.km after the storage.

EXAMPLE 13

A mixture comprising polymer Al and perfluoro (diphenylsulfide) manufactured by Aldrich Co. (the latter being 6 wt % in the mixture), was charged into a sealed glass tube and melt-molded at 250° C. to obtain a cylindrical molded product (hereinafter referred to as molded product j). Molded product j had a refractive index of 1.357 and a Tg of 77° C.

Then, a cylindrical tube made solely of polymer Al was prepared by melt molding, and molded product j was inserted into this cylindrical tube and heated to 200° C. for integration to obtain a preform. This preform was melt-spun at 230° C. to obtain a graded-refractive-index optical fiber wherein the refractive index gradually decreased from the center towards the periphery. The light transmission property of the obtained optical fiber was 190 dB/km at 780 nm, 150 dB/km at 850 nm and 120 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an interference microscope and compared with the refractive index gradient before the storage, whereby a decrease in the refractive index was observed in the vicinity of the center of the core. Accordingly, a decrease in the transmission bandwidth was observed. Namely, the transmission bandwidth of 260 MHz.km before the storage was found to have decreased to 180 MHz.km after the storage.

EXAMPLE 14

A mixture comprising polymer Al and perfluoronaphthalene (refractive index: 1.48) manufactured by Aldrich Co. (the latter being 6 wt % in the mixture), was charged into a sealed glass tube and melt-molded at 250° C. to obtain a cylindrical molded product (hereinafter referred to as molded product k). Molded product k had a refractive index of 1.357 and a Tg of 76° C.

Then, a cylindrical tube made solely of polymer Al was prepared by melt molding, and molded product k was inserted into this cylindrical tube and heated to 200° C. for integration to obtain a preform. This preform was melt-spun at 230° C. to obtain a graded-refractive-index optical fiber wherein the refractive index gradually decreased from the center towards the periphery. The light transmission property of the obtained optical fiber was 180 dB/km at 780 nm, 150 dB/km at 850 nm and 110 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an interference microscope and compared with the refractive index gradient before the storage, whereby a decrease in the refractive index was observed in the vicinity of the center of the core. Accordingly, a decrease in the transmission bandwidth was observed. Namely, the transmission bandwidth of 220 MHz.km before the storage was found to have decreased to 110 MHz.km after the storage.

EXAMPLE 15

A mixture comprising polymer Al and 1,3,5-trichloro-2, 4,6-trifluorobenzene manufactured by PCR Co. (the latter being 6 wt % in the mixture), was charged into a sealed glass tube and melt-molded at 250° C. to obtain a cylindrical molded product (hereinafter referred to as molded product m). Molded product m had a refractive index of 1.355 and a Tg of 79° C.

Then, a cylindrical tube made solely of polymer Al was prepared by melt molding, and molded product m was inserted into this cylindrical tube and heated to 200° C. for integration to obtain a preform. This preform was melt-spun at 230° C. to obtain a graded-refractive-index optical fiber wherein the refractive index gradually decreased from the center towards the periphery. The light transmission property of the obtained optical fiber was 210 dB/km at 780 nm, 170 dB/km at 850 nm and 130 dB/km at 1,300 nm. Thus, the optical fiber was confirmed to be capable of transmitting light ranging from visible light to near infrared light satisfactorily.

This optical fiber was stored in an oven of 70° C. for 1,000 hours and then taken out, whereupon the refractive index gradient was measured by an interference microscope and compared with the refractive index gradient before the storage, whereby a decrease in the refractive index was observed in the vicinity of the center of the core. Accordingly, a decrease in the transmission bandwidth was observed. Namely, the transmission bandwidth of 250 MHz.km before the storage was found to have decreased to 170 MHz.km after the storage.

EXAMPLE 16

A mixture comprising polymer A2 and 2,4,6-tris (perfluorophenyl)-1,3,5-triazine (the latter being 5 wt % in the mixture), was charged into a sealed glass tube and melt-molded at 250° C. to obtain a cylindrical molded product (hereinafter referred to as molded product n). Molded product n had a refractive index of 1.340 and a Tg of 130° C.

Then, a cylindrical tube made solely of polymer A2 was prepared by melt molding, and molded product n was inserted into this cylindrical tube and heated at 230° C. for integration to obtain a preform. This preform was melt-spun at 270° C. to obtain an optical fiber wherein the refractive index gradually decreased from the center towards the periphery. The light transmission property of the obtained optical fiber was 250 dB/km at 780 nm, 200 dB/km at 850 nm and 170 dB/km at 1,300 nm. Thus, the optical fiber was confirmed to be capable of transmitting light ranging from visible light to near infrared light satisfactorily.

This optical fiber was stored in an oven of 85° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as in Example 4, and the property was compared as between before and after the storage, whereby no decrease in the transmission bandwidth was observed at 280 dB.km, whereby the thermal resistance was confirmed to be good.

EXAMPLE 17

A mixture comprising polymer A3 and 2,4,6-tris (perfluorophenyl)-1,3,5-triazine (the latter being 5 wt % in the mixture), was charged into a sealed glass tube and melt-molded at 250° C. to obtain a cylindrical molded product (hereinafter referred to as molded product p). Molded product p had a refractive index of 1.320 and a Tg of 140° C.

Then, a cylindrical tube made solely of polymer A3 was prepared by melt molding, and molded product p was inserted into this cylindrical tube and heated to 230° C. for integration to obtain a preform. This preform was melt-spun at 270° C. to obtain an optical fiber wherein the refractive index gradually decreased from the center towards the periphery. The light transmission property of the obtained optical fiber was 300 dB/km at 780 nm, 250 dB/km at 850 nm and 200 dB/km at 1,300 nm. Thus, the optical fiber was confirmed to be capable of transmitting light ranging from visible light to near infrared light satisfactorily.

This optical fiber was stored in an oven of 85° C. for 1,000 hours and then taken out, whereupon the refractive index gradient was measured by an Interphako interference microscope and compared with the refractive index gradient before the storage, whereby no particular change was observed. Further, the transmission bandwidth was measured by the same pulse method as in Example 4, and the property was compared as between before and after the storage, whereby no decrease in the transmission bandwidth was observed at 260 dB.km, whereby the thermal resistance was confirmed to be good.

The compound (B) in the present invention has a high refractive index and thus has a merit in that the desired refractive index difference can be formed even by its addition in a small amount, and a decrease in Tg by the addition of the compound (B) is little. With this merit together with a merit that Tg of the compound (B) is high, the optical plastic material of the present invention can have the thermal resistance remarkably improved, so that the thermal stability of the refractive index gradient is high and a decrease in the transmission bandwidth can be prevented even when it is exposed to a high temperature of at least room temperature for a long period of time. Further, the compound (B) having a high refractive index can be made to have a large numerical aperture NA.

Further, the compound (B) has good solubility in the polymer (A), whereby the transparency of the optical plastic material of the present invention is good, and light scattering due to microscopic phase separation or due to crystallites of the compound (B) is little.

What is claimed is:

1. A graded-refractive-index optical plastic material comprising an amorphous fluorine-containing polymer (A) having substantially no C—H bond, and at least one fluorine-containing polycyclic compound (B) having a refractive index higher by at least 0.005 than the fluorine-containing polymer (A), wherein the fluorine-containing polycyclic compound (B) is distributed in the fluorine-containing polymer (A) with a concentration gradient such that the concentration decreases in a direction of from the center to the periphery, and the fluorine-containing polycyclic compound (B) is at least one fluorine-containing polycyclic compound selected from the group consisting of the following compounds (B1), (B2) and (B3):

(B1) a fluorine-containing non-condensed polycyclic compound having at least two fluorine-containing rings bonded by a bond containing at least one member selected from the group consisting of a triazine ring, an oxygen atom, a sulfur atom, a phosphorus atom and a metal atom, each of said fluorine-containing rings being a carbon ring or a heterocyclic ring and having a fluorine atom or a perfluoroalkyl group, said polycyclic compound having substantially no C—H bond;

(B2) a fluorine-containing non-condensed polycyclic compound having at least three fluorine-containing rings bonded directly or by a bond containing a carbon atom, each of said fluorine-containing rings being a carbon ring or a heterocyclic ring and having a fluorine atom or a perfluoroalkyl group, said polycyclic compound having substantially no C—H bond;

(B3) a fluorine-containing condensed polycyclic compound which is a condensed polycyclic compound composed of at least three carbon rings or heterocyclic rings, and which has substantially no C—H bond.

2. The graded-refractive-index optical plastic material according to claim 1, which has a numerical aperture NA of at least 0.20, when $NA=(n^2-m^2)^{1/2}$, where n is the maximum value of the refractive index in the graded-refractive-index optical plastic material, and m is the minimum value of the refractive index in the graded-refractive-index optical plastic material.

3. The graded-refractive-index optical plastic material according to claim 1, wherein the glass transition temperature of the center portion of the graded-refractive-index optical plastic material is at least 70° C.

4. The graded-refractive-index optical plastic material according to claim 1, wherein the concentration of the fluorine-containing polycyclic compound (B) at the center portion of the graded-refractive-index optical plastic material is at most 15 wt %.

5. The graded-refractive-index optical plastic material according to claim 1, wherein the optical plastic material is a graded-refractive-index optical fiber or a preform for the production of a graded-refractive-index optical fiber.

6. The graded-refractive-index optical plastic material according to claim 1, wherein the fluorine-containing polymer (A) is a fluorine-containing polymer having a fluorine-containing alicyclic structure in its main chain.

7. The graded-refractive-index optical plastic material according to claim 1, wherein the fluorine-containing polymer (A) has a number average molecular weight of from $1\times10^4$ to $5\times10^6$.

8. The graded-refractive-index optical plastic material according to claim 1, wherein the fluorine-containing polycyclic compound (B) has a refractive index of at least 1.45.

9. The graded-refractive-index optical plastic material according to claim 1, wherein the fluorine-containing polycyclic compound (B) has a number average molecular weight of from $3\times10^2$ to $2\times10^3$.

10. The graded-refractive-index optical plastic material according to claim 1, wherein each of said carbon rings is an at least 4-membered ring.

11. The graded-refractive-index optical plastic material according to claim 1, wherein each of said carbon rings is a cyclic saturated hydrocarbon ring or a cyclic unsaturated hydrocarbon ring.

12. The graded-refractive-index optical plastic material according to claim 11, wherein the cyclic saturated hydrocarbon ring is a cyclopentane ring or a cyclohexane ring.

13. The graded-refractive-index optical plastic material according to claim 11, wherein the cyclic unsaturated hydrocarbon ring is a cyclopentene ring, a cyclohexene ring or a benzene ring.

14. The graded-refractive-index optical plastic material according to claim 1, wherein each of said heterocyclic rings is an at least 4-membered ring.

15. The graded-refractive-index optical plastic material according to claim 1, wherein the atoms constituting each of said heterocyclic rings are selected from a carbon atom, a nitrogen atom, an oxygen atom, a sulfur atom and a phosphorus atom.

16. The graded-refractive-index optical plastic material according to claim 1, wherein each of said heterocyclic rings is a heterocyclic ring containing one or two types of hetero atoms.

17. The graded-refractive-index optical plastic material according to claim 16, wherein the heterocyclic ring containing one type of a hetero atom is a thiophene ring, a furan ring, a pyridine ring or a triazole ring.

18. The graded-refractive-index optical plastic material according to claim 16, wherein the heterocyclic ring containing two types of hetero atoms is a triazole ring or an isothiazole ring.

19. The graded-refractive-index optical plastic material according to claim 1, wherein said fluorine-containing non-condensed polycyclic compound is a compound having at least two fluorine-containing rings bonded by a bond containing at least a triazine ring.

20. The graded-refractive-index optical plastic material according to claim 1, wherein said metal atom is a bivalent to tetravalent metal selected from the group consisting of Zn, Sn, Pb, Ge, Si, Ti, Hg, Tl, As, Se, Te and Cd.

* * * * *